United States Patent
Terada et al.

(10) Patent No.: US 11,014,104 B2
(45) Date of Patent: May 25, 2021

(54) STATE DETERMINATION DEVICE, METHOD, PROGRAM, STORAGE MEDIUM

(71) Applicant: ABB SCHWEIZ AG, Baden (CH)

(72) Inventors: Masaru Terada, Shizuoka (JP); Steinar Riveland, Klepp stasjon (NO)

(73) Assignee: ABB SCHWEIZ AG, Baden (CH)

( * ) Notice: Subject to any disclaimer, the term of this patent is extended or adjusted under 35 U.S.C. 154(b) by 197 days.

(21) Appl. No.: 16/313,086

(22) PCT Filed: Jun. 1, 2017

(86) PCT No.: PCT/JP2017/020498
§ 371 (c)(1),
(2) Date: Dec. 24, 2018

(87) PCT Pub. No.: WO2018/003396
PCT Pub. Date: Jan. 4, 2018

(65) Prior Publication Data
US 2019/0314842 A1 Oct. 17, 2019

(30) Foreign Application Priority Data

Jun. 30, 2016 (JP) .............................. JP2016-129792

(51) Int. Cl.
*B05B 12/00* (2018.01)
*B05B 5/04* (2006.01)
*B05B 3/10* (2006.01)

(52) U.S. Cl.
CPC .......... *B05B 5/0415* (2013.01); *B05B 3/1035* (2013.01); *B05B 12/004* (2013.01)

(58) Field of Classification Search
CPC .... B05B 5/0415; B05B 3/1035; B05B 12/004
(Continued)

(56) References Cited

U.S. PATENT DOCUMENTS

2004/0143398 A1* 7/2004 Nelson ................. G01H 1/00
702/14
2005/0263611 A1 12/2005 Gotoh et al.
(Continued)

FOREIGN PATENT DOCUMENTS

CN 101850312 10/2010
JP H07-311082 A 11/1995
(Continued)

OTHER PUBLICATIONS

Chinese Office Action dated Aug. 12, 2020 issued in Chinese patent application No. 2017800405847 with corresponding English translation.
(Continued)

*Primary Examiner* — Robert R Raevis
(74) *Attorney, Agent, or Firm* — Greenblum & Bernstein, P.L.C.

(57) ABSTRACT

A state determination device determines a state of a paint device including an air motor that rotates by a supply of a gas, a rotational shaft that serves as a rotational center of the air motor, and a rotary atomizer head that is connected to the rotational shaft and sprays paint. The paint device further includes a vibration detection unit that detects a vibration of the paint device, and the state determination device includes a frequency component acquisition unit and an abnormality determination unit. The frequency component acquisition unit acquires a frequency component caused by a contact between the rotational shaft and the air motor from a detection result by the vibration detection unit. The abnormality determination unit determines whether an abnormality of the air motor exists or not based on an acquisition result by the frequency component acquisition unit.

17 Claims, 7 Drawing Sheets

(58) Field of Classification Search
USPC .... 73/1.68, 66, 457, 460, 462, 865.8, 865.9, 73/432.1; 239/71–73; 118/712; 427/8; 417/63; 340/679, 682, 683
See application file for complete search history.

(56) References Cited

U.S. PATENT DOCUMENTS

| | | |
|---|---|---|
| 2007/0157881 A1 | 12/2007 | Yasuda et al. |
| 2015/0102124 A1* | 4/2015 | Hu .................... B05B 12/08 239/71 |

FOREIGN PATENT DOCUMENTS

| | | |
|---|---|---|
| JP | H09-117696 A | 5/1997 |
| JP | 2001-198498 A | 7/2001 |
| JP | 2002-192022 A | 7/2002 |
| JP | 2003-001147 A | 1/2003 |
| JP | 2010-253434 A | 11/2010 |
| WO | 2005/079996 A1 | 1/2005 |

OTHER PUBLICATIONS

International Search Report in International Patent Application No. PCT/JP2017/020498, dated Aug. 29, 2017.
International Preliminary Report on Patentability in International Patent Application No. PCT/JP2017/020498, dated Jan. 1, 2019.
European Search Report dated Feb. 6, 2020 and issued in European Application No. 17819762.0.
Martin Angelo: "Vibration Monitoring of Machines", Technical Review,, No. 1, Jan. 1, 1987(Jan. 1, 1987), pp. 1-36, XP001420537.
Chinese Office Action issued in Chinese Patent Application No. 201780040584.7 dated Feb. 1, 2021, with corresponding English translation.

* cited by examiner

STATE DETERMINATION DEVICE, METHOD, PROGRAM, STORAGE MEDIUM

TECHNICAL FIELD

The present invention relates to detection of an abnormality of a paint device.

BACKGROUND ART

Hitherto, there is known a paint device that uses an air motor to rotate a rotary atomizer head (for example, refer to Patent Document 1). The rotary atomizer head is connected to a rotational shaft of the air motor. In this configuration, if the rotary atomizer head is eccentric with respect to the rotational shaft, centrifugal whirling is generated, and the rotational shaft, a bearing of the air motor, or the like may be consequently damaged.

CITATION LIST

Patent Document

Patent Document 1: JP 2002-192022 A

SUMMARY OF INVENTION

However, it is difficult to detect the centrifugal whirling of the rotary atomizer head, and may be recognized only after the rotational shaft, the bearing of the air motor, or the like is damaged. It should be noted that an abnormality in rotation such as the centrifugal whirling occurs not only in the rotary atomizer head but also in rotating portions (such as a paint gear pump and a wrist device of a paint robot) in the paint device.

Therefore, the present invention has an object of detecting the abnormality of the rotating portions in the paint device.

According to the present invention, a state determination device for determining a state of a paint device including an air motor that rotates by a supply of a gas, a rotational shaft that serves as a rotational center of the air motor, and a rotary atomizer head that is connected to the rotational shaft and sprays paint, the paint device further including a vibration detection unit that detects a vibration of the paint device, the state determination device includes: a frequency component acquisition unit that acquires a frequency component caused by a contact between the rotational shaft and the air motor from a detection result by the vibration detection unit; and an abnormality determination unit that determines whether an abnormality of the air motor exists or not based on an acquisition result by the frequency component acquisition unit.

According to the thus constructed state determination device, a state determination device for determining a state of a paint device including an air motor that rotates by a supply of a gas, a rotational shaft that serves as a rotational center of the air motor, and a rotary atomizer head that is connected to the rotational shaft and sprays paint, can be provided. The paint device further includes a vibration detection unit that detects a vibration of the paint device. A frequency component acquisition unit acquires a frequency component caused by a contact between the rotational shaft and the air motor from a detection result by the vibration detection unit. An abnormality determination unit determines whether an abnormality of the air motor exists or not based on an acquisition result by the frequency component acquisition unit.

According to the state determination device of the present invention, the vibration detection unit may be any one of an acceleration sensor, a microphone, and a displacement sensor.

According to the state determination device of the present invention, the vibration detection unit may be arranged on a side opposite to the rotary atomizer head with respect to the air motor.

According to the state determination device of the present invention, the paint device may further include a gear pump that feeds the paint toward the rotary atomizer head, and a rotational unit for changing an attitude of the rotary atomizer head; the frequency component acquisition unit may further acquire a frequency component caused by a contact during a rotation of a gear in the gear pump and/or a contact during a rotation of a rotational member in the rotational unit; and the abnormality determination unit may further determine whether an abnormality of the gear pump and/or the rotational unit exists or not based on the acquisition result by the frequency component acquisition unit.

According to the state determination device of the present invention, the vibration detection unit may be arranged between the air motor and the rotational unit.

According to the state determination device of the present invention, the rotational unit may be arranged between the air motor and the gear pump.

According to the state determination device of the present invention, the paint device may further include an angular acceleration detection unit that detects an angular acceleration of the paint device; and the abnormality determination unit may further determine whether an abnormality of the paint device exists or not based on a detection result by the angular acceleration detection unit.

According to the state determination device of the present invention, the frequency component detection unit may acquire the detection result from the vibration detection unit via wireless communication.

According to the present invention, a state determination method of determining a state of a paint device including an air motor that rotates by a supply of a gas, a rotational shaft that serves as a rotational center of the air motor, and a rotary atomizer head that is connected to the rotational shaft and sprays paint, the paint device further including a vibration detection unit that detects a vibration of the paint device, includes: acquiring a frequency component caused by a contact between the rotational shaft and the air motor from a detection result by the vibration detection unit; and determining whether an abnormality of the air motor exists or not based on an acquisition result by the acquiring of the frequency component.

The present invention is a program of instructions for execution by a computer to perform a state determination process of determining a state of a paint device including an air motor that rotates by a supply of a gas, a rotational shaft that serves as a rotational center of the air motor, and a rotary atomizer head that is connected to the rotational shaft and sprays paint, the paint device further including a vibration detection unit that detects a vibration of the paint device, the state determination process including: acquiring a frequency component caused by a contact between the rotational shaft and the air motor from a detection result by the vibration detection unit; and determining whether an abnormality of the air motor exists or not based on an acquisition result by the acquiring of the frequency component.

According to the present invention, a non-transitory computer-readable medium having a program of instructions for execution by a computer to perform a state determination process of determining a state of a paint device including an air motor that rotates by a supply of a gas, a rotational shaft that serves as a rotational center of the air motor, and a rotary atomizer head that is connected to the rotational shaft and sprays paint, the paint device further including a vibration detection unit that detects a vibration of the paint device, the state determination process including: acquiring a frequency component caused by a contact between the rotational shaft and the air motor from a detection result by the vibration detection unit; and determining whether an abnormality of the air motor exists or not based on an acquisition result by the acquiring of the frequency component.

MODES FOR CARRYING OUT THE INVENTION

A description will now be given of embodiments of the present invention referring to drawings.

First Embodiment

Figure 1:
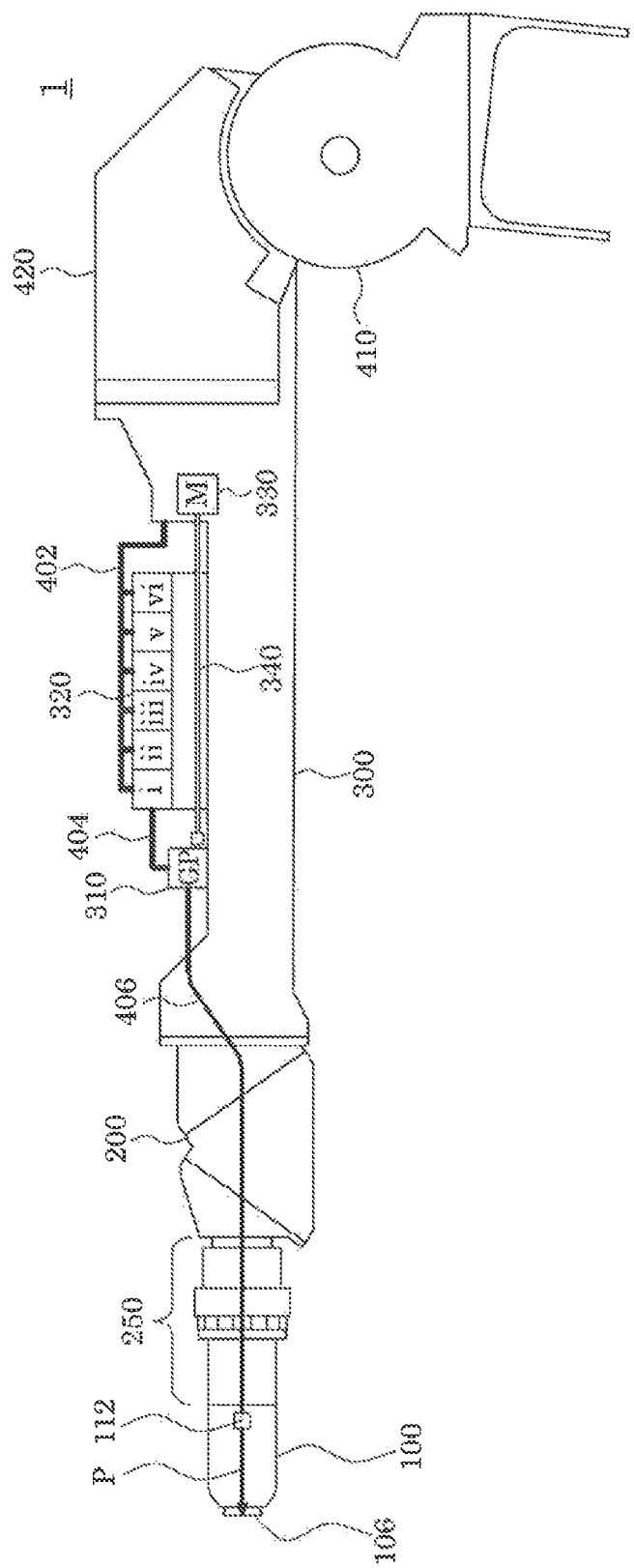
FIG. 1 is a front view of a paint device 1 according to a first embodiment of the present invention.

FIG. 1 is a front view of a paint device 1 according to a first embodiment of the present invention. The paint device 1 according to the embodiment of the present invention includes a paint tool 100. The paint device 1 further includes a well-known hollow wrist 200, a connection unit 250, a robot arm 300, a gear pump 310, color switch valves 320, a motor 330, a drive shaft 340, tubes 402, 404, and 406, a shoulder unit 410, and a connection unit 420.

The paint tool 100 is a tool attached to a distal end of the robot arm 300 via the hollow wrist 200 and a wrist unit (rotational units). The paint tool 100 is a tool for applying paint P to a subject to painting (such as a body of a vehicle), not shown.

The hollow wrist 200 and the connection unit 250 (correspond to the "rotational units") are configured to change an attitude of (a rotary atomizer head 106 of) the paint tool 100 with respect to the distal end of the robot arm 300.

The connection unit 250 is configured to engage the hollow wrist 200 and the paint tool 100 with each other. The paint tool 100 is directly attached to the connection unit 250.

The hollow wrist 200 includes gears and bearings, and rotational motions of the gears and the bearings are transmitted to the paint tool 100 via the connection unit 250, thereby changing the attitude of (the rotary atomizer head 106 of) the paint tool 100. It should be noted that the connection unit 250 is arranged between the hollow wrist 200 and the paint tool 100.

The robot arm 300 is configured to receive a rotational motion of the shoulder unit 410, and transmits the rotational motion to the paint tool 100 via the hollow wrist 200 and the connection unit 250. The gear pump 310 includes gears, and the paint P is pressurized by rotations of the gears, thereby feeding the paint P via tubes 402 and 404 from a paint source (connected to the tube 402), not shown, and via a tube 406 toward the rotary atomizer head 106. The color switching valves 320 include six valves, i, ii, iii, iv, v, and vi, for example, and are arranged between the tube 402 and the tube 404. Opening/closing of each of the color switching valves 320 changes a color of the paint P. The motor 330 drives the gear pump 310 via the drive shaft 340. The drive shaft 340 is a rotational shaft for driving the gear pump 310.

The shoulder unit 410 is rotatable, includes a motor, and is connected to a robot main body, not shown. The connection unit 420 connects the shoulder unit 410 and the robot arm 300 with each other.

Figure 2:
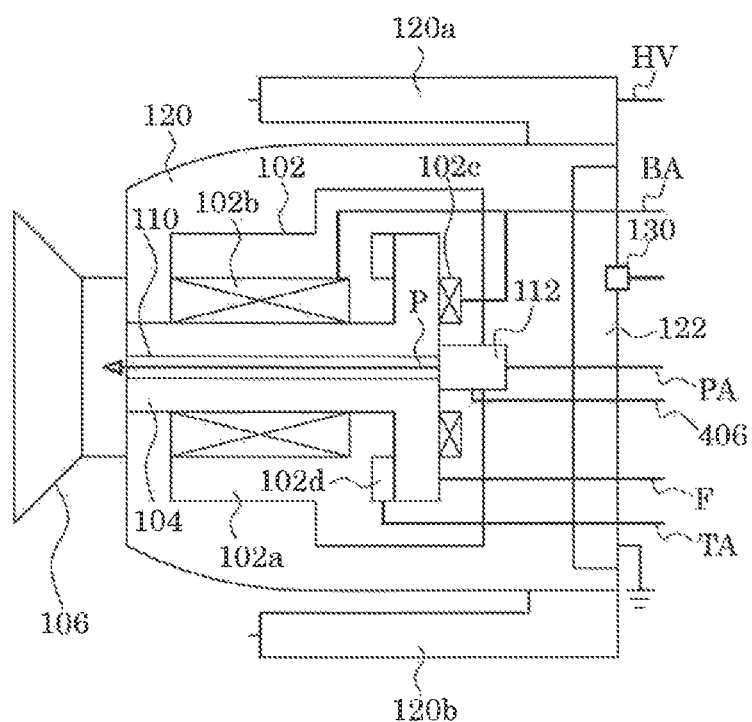
FIG. 2 is a front transparent view of the paint tool 100 according to the first embodiment of the present invention.

FIG. 2 is a front transparent view of the paint tool 100 according to the first embodiment of the present invention. The paint tool 100 according to the embodiment of the present invention includes an air motor 102, a rotational shaft 104, a rotary atomizer head 106, a feed tube 110, a trigger valve 112, a housing 120, external electrodes 120a and 120b, a rear plate 122, and a vibration detection unit 130.

The air motor 102 includes an air motor housing 102a, a radial air bearing 102b, a thrust air bearing 102c, and a turbine 102d.

The air motor housing 102a is a housing of the air motor 102. The radial air bearing 102b is a radial bearing provided inside the air motor housing 102a, and supporting the rotational shaft 104. The thrust air bearing 102c is a thrust bearing provided inside the air motor housing 102a, and supporting the rotational shaft 104. The radial air bearing 102b is arranged closer to the rotary atomizer head 106 than the thrust air bearing 102c. The radial air bearing 102b and the thrust air bearing 102c are air bearings. Air (bearing air) BA (such as compressed air) for operating the radial air bearing 102b and the thrust air bearing 102c as the air bearings is supplied from the outside of the paint tool 100. The turbine 102d is an impeller. The thrust air bearing 102c is in contact with an end surface on a right side of the rotational shaft 104 via the air (bearing air) BA.

The air motor 102 rotates by a supply of gas (turbine air) TA (such as the air). In other words, the gas (turbine air) TA is blown on the turbine 102d of the air motor 102, thereby rotating the turbine 102d about the rotational shaft 104. The rotational speed is 3,000 to 150,000 rpm, for example. It should be noted that the rotational speed may be changed in accordance with a paint condition.

The rotational shaft 104 is a rotational center of the air motor 102. In other words, the rotations shaft 104 is a rotational center of the turbine 102d of the air motor 102. A tapered surface (not shown) having a diameter decreasing forward is provided forward (on a rotary atomizer head 106 side) of the rotational shaft 104. A male thread (not shown)

for attaching the rotary atomizer head 106 is formed forward of this tapered surface, and the rotary atomizer head 106 is attached thereto.

The rotary atomizer head 106 is connected to the rotational shaft 104, and sprays the paint P.

The feed tube 110 is configured to supply the paint P or cleaning fluid (not shown) toward the rotary atomizer head 106. The feed tube 110 passes through the rotational shaft 104, and extends to a distal end of the rotational shaft 104. A distal end side of the feed tube 110 protrudes from the distal end of the rotational shaft 104, and protrudes from the rotary atomizer head 106.

The trigger valve 112 is in contact with an end surface on the right side of the rotational shaft 104, and is connected to the feed tube 110. The trigger valve 112 is driven by pilot air PA (such as the air), and switches whether the paint P is caused to flow through the feed tube 110 or not.

The housing 120 is a housing for the paint tool 100, and opens rearward (on an opposite side of the rotary atomizer head 106). The air motor 102, the rotational shaft 104, the feed tube 110, and the trigger valve 112 are arranged inside the housing 120. The rear plate 122 is configured to close a rearward opening in the housing 120. It should be noted that the rear plate 122 is grounded.

The external electrodes 120a and 120b are arranged outside the housing 120, and a high voltage HV is impressed thereon from the outside of the paint tool 100. As a result, a high voltage (such as minus 90 kV) is impressed on the air motor 102, the feed tube 110, and the rotary atomizer head 106 during the painting.

The vibration detection unit 130 detects vibrations of the paint device 1. The vibration detection unit 130 is an acceleration sensor, for example, but may be a microphone or a displacement sensor. The vibration detection unit 130 is arranged on an opposite side of the rotary atomizer head 106 as viewed from the air motor 102. The vibration detection unit 130 is arranged between the rotary atomizer head 106 and the gear pump 310. The vibration detection unit 130 is arranged on the rear plate 122.

It should be noted that the hollow wrist 200 and the connection unit 250 (rotational units) are arranged between the air motor 102 and the gear pump 310. Moreover, a rotation detection fiber cable F is configured to extract a measurement result by a sensor (not shown) for detecting a rotational speed of the air motor 102 to the outside of the paint tool 100.

Figure 3:
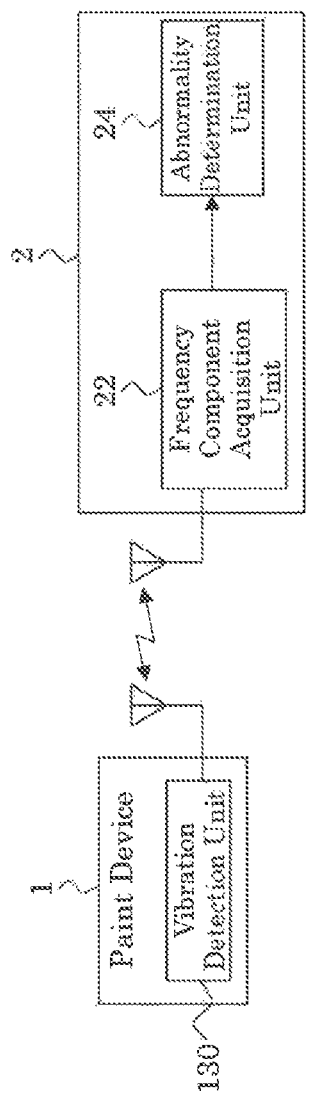
FIG. 3 is a functional block diagram of the paint device 1 and the state determination device 2 according to the first embodiment of the present invention.

FIG. 3 is a functional block diagram of the paint device 1 and the state determination device 2 according to the first embodiment of the present invention. It should be noted that the paint device 1 is schematically illustrated as a block, and only the vibration detection unit 130 out of components is illustrated as a block in FIG. 3. The state determination device 2 is configured to determine a state of the paint device 1, and includes a frequency component acquisition unit 22 and an abnormality determination unit 24.

The frequency component acquisition unit 22 acquires frequency components caused by a contact between the rotational shaft 104 and the air motor 102 from the detection result by the vibration detection unit 130. It should be noted that the frequency component acquisition unit 22 acquires the detection result by the vibration detection unit 130 therefrom via wireless communication. It should be noted that it is also conceivable to acquire the detection result via wired communication.

The abnormality determination unit 24 determines whether an abnormality of the air motor 104 exists or not based on an acquisition result by the frequency component acquisition unit 22.

Figure 4:
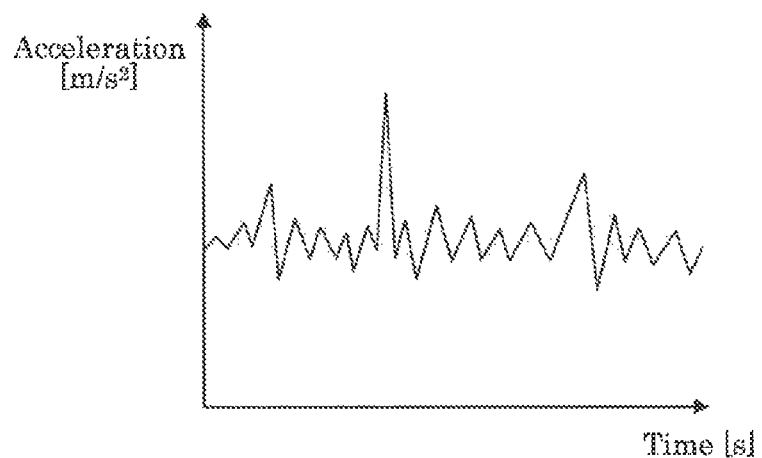
FIG. 4(a) and FIG. 4(b) are charts for showing the detection result (FIG. 4(a)) by the vibration detection unit 130 and the acquisition result (FIG. 4(b)) by the frequency component acquisition unit 22 according to the first embodiment of the present invention.
Figure 4:
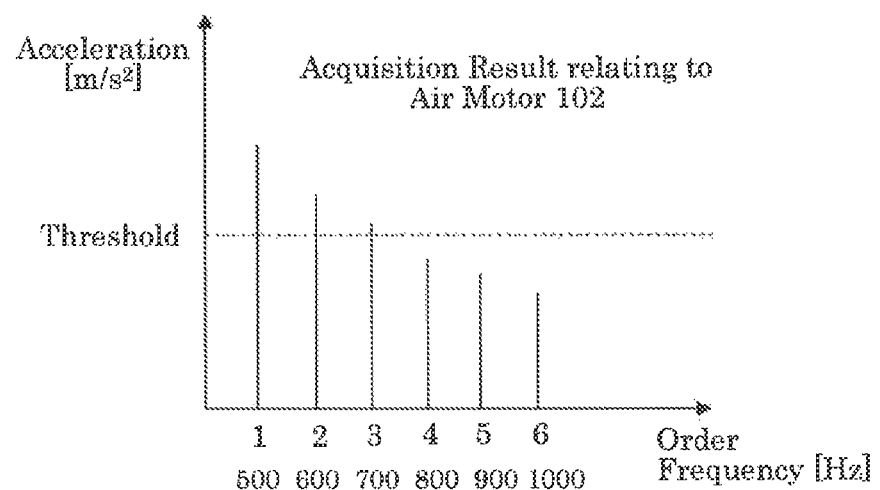

FIG. 4(a) and FIG. 4(b) are charts for showing the detection result (FIG. 4(a)) by the vibration detection unit 130 and the acquisition result (FIG. 4(b)) by the frequency component acquisition unit 22 according to the first embodiment of the present invention.

Referring to FIG. 4(a), the vibration detection unit 130 detects the vibration of the paint device 1 as a change in the acceleration [m/s$^2$] with respect to the time [s]. Though the paint device 1 vibrates due to various factors, the vibrations also contain the vibrations caused by the contact between the rotational shaft 104 and the air motor 102.

In other words, if the rotary atomizer head 106 is eccentric with respect to the rotational shaft 104 (in addition, (1) inappropriate supplies of the bearing air BA and the turbine air TA, (2) a gyro moment load due to a quick deceleration and a quick acceleration of the paint device 1, and (3) a defective attachment of the feed tube 110 also constitute causes), centrifugal whirling occurs, and the rotational shaft 104 and the air motor 102 come in contact with each other.

This contact occurs once while the air motor 102 rotates once, for example. In this state, when the rotational speed of the air motor 102 is 30 krpm, the contact between the rotational shaft 104 and the air motor 102 occurs 500 times per second. Thus, a vibration at 500 Hz occurs. It should be noted that this contact may occur 12, 14, 16, 18, 20, . . . times while the air motor 102 rotates 10 times. Thus, vibrations at 600, 700, 800, 900, 1,000, . . . Hz occur. It should be noted that the vibrations at 500, 600, 700, 800, 900, 1,000, . . . Hz are respectively referred to as 1st, 2nd, 3rd, 4th, 5th, 6th, . . . -order vibrations.

Referring to FIG. 4(b), the frequency component acquisition unit 22 applies the FFT analysis to the detection result by the vibration detection unit 130 to acquire components of the vibrations at 500, 600, 700, 800, 900, 1,000, . . . Hz (1st, 2nd, 3rd, 4th, 5th, 6th, . . . -order vibrations). The abnormality determination unit 24 defines a threshold for the 1st, 2nd, 3rd, 4th, 5th, 6th, . . . -order vibrations, and determines that the abnormality (such as the centrifugal whirling) of the air motor 104 occurs if the vibration component of each of the orders exceeds the threshold.

In the case shown in FIG. 4(b), the 1st, 2nd, and 3rd-order vibrations exceed the threshold, and it is thus determined that the abnormality (such as the centrifugal whirling) of the air motor 104 occurs. It should be noted that if the abnormality (such as the centrifugal whirling) of the air motor 104 is not present, the accelerations corresponding to the 1st, 2nd, 3rd, 4th, 5th, 6th, . . . -order vibrations do not exceed the threshold.

It should be noted that the vibration detection unit 130 detects the vibrations of the paint device 1 as the change in the acceleration [m/s$^2$] with respect to the time [s], and any of vertical axes of FIG. 4(a) and FIG. 4(b) thus represent the acceleration [m/s$^2$]. However, if the vibration detection unit 130 is a microphone, the microphone detects the vibrations of the paint device 1 as a change in a sound pressure [dB] with respect to the time [s], and any of the vertical axes of FIG. 4(a) and FIG. 4(b) thus represent the sound pressure [dB]. Moreover, if the vibration detection unit 130 is a displacement sensor, the displacement sensor detects the vibrations of the paint device 1 as a change in a displacement [m] of a portion at which the vibration detection unit 130 is arranged with respect to the time [s], and any of the vertical axes of FIG. 4(a) and FIG. 4(b) thus represent the displacement [m].

A description will now be given of an operation of the first embodiment.

The turbine air TA is blown on the turbine 102d of the air motor 102, thereby rotating the turbine 102d about the rotational shaft 104. The rotation of the rotational shaft 104 is transmitted to the rotary atomizer head 106, and the rotary atomizer head 106 also rotates.

The gear pump 310 is driven via the drive shaft 340. The gear pump 310 pressurizes the paint P by the rotations of the gears contained in itself, thereby feeding the paint P via the tubes 402 and 404 from the paint source, not shown, and via the tube 406 toward the rotary atomizer head 106. The paint P flows via the trigger valve 112 into the feed tube 110.

The paint P is supplied from the feed tube 110 to the inside of the rotary atomizer head 106. The paint P propagates over a surface of the rotary atomizer head 106, and is formed into a thin film by a centrifugal force of the rotary atomizer head 106. The paint P formed into the thin film is brought into a liquid ligament state from a circumferential end of the rotary atomizer head 106, and adheres to the subject to painting in the grounded state, not shown. As a result, the subject to painting is painted with the paint P.

It should be noted that the rotations of the gears of the hollow wrist 200 change the attitude of (the rotary atomizer head 106 of) the paint tool 100 with respect to the distal end of the robot arm 300 via the connection unit 250.

The vibration detection unit 130 detects the vibrations of the paint device 1. The detection result is transmitted to the frequency component acquisition unit 22 of the state determination device 2 via the wireless communication.

The frequency component acquisition unit 22 acquires the frequency components caused by the contact between the rotational shaft 104 and the air motor 102 from the detection result by the vibration detection unit 130.

On this occasion, if there are not causes such as the eccentricity of the rotary atomizer head 106 with respect to the rotational shaft 104, the air motor 102 normally rotates, and the accelerations corresponding to the 1st, 2nd, 3rd, 4th, 5th, 6th, . . . -order vibrations (refer to FIG. 4(b)) do not exceed the threshold. In this case, the abnormality determination unit 24 determines that the air motor 104 is normal.

However, if there are causes such as the eccentricity of the rotary atomizer head 106 with respect to the rotational shaft 104, the abnormality (such as the centrifugal whirling) of the air motor 104 occurs, and the accelerations corresponding to the 1st, 2nd, 3rd, 4th, 5th, 6th, . . . -order vibrations (refer to FIG. 4(b)) exceed the threshold. In this case, the abnormality determination unit 24 determines that the abnormality (such as the centrifugal whirling) of the air motor 104 occurs.

According to the first embodiment, the abnormality of the air motor 102, which is the rotating portion in the paint device 1, can be detected.

Second Embodiment

The state determination device 2 according to a second embodiment is different from that according to the first embodiment in such a point that the state determination device 2 can detect abnormalities in the gear pump 310 and the rotational units (the hollow wrist 200 and the connection unit 250) in addition to the air motor 102. It should be noted that the state determination device 2 according to the second embodiment may detect the abnormality only in the gear pump 310 or the rotational units (the hollow wrist 200 and the connection unit 250) in addition to the air motor 102.

A configuration of the paint device 1 according to the second embodiment is the same as that of the first embodiment, and a description thereof is therefore omitted.

The state determination device 2 according to the second embodiment is configured to determine a state of the paint device 1, and includes the frequency component acquisition unit 22 and the abnormality determination unit 24 (as in FIG. 3).

The frequency component acquisition unit 22 according to the second embodiment acquires the frequency components caused by the contact between the rotational shaft 104 and the air motor 102 as in the first embodiment. Further, the frequency component acquisition unit 22 according to the second embodiment acquires frequency components caused by a contact during the rotations of the gears in the gear pump 310 and a contact during the rotations of rotational members (such as the gears and the bearings) in the rotational units (the hollow wrist 200 and the connection unit 250).

The abnormality determination unit 24 according to the second embodiment determines whether the abnormality of the air motor 104 exists or not as in the first embodiment. Further, the abnormality determination unit 24 according to the second embodiment further determines whether the abnormalities in the gear pump 310 and the rotational units exist based on the acquisition result by the frequency component acquisition unit 22.

The vibration detection unit 130 detects the vibrations of the paint device 1 as the change in the acceleration [m/s$^2$] with respect to the time [s]. Though the paint device 1 vibrates due to various factors, the vibrations also contain vibrations caused by the contact between the rotational shaft 104 and the air motor 102. Further, the vibrations also contain vibrations caused by the contact during the rotations of the gears in the gear pump 310. Furthermore, the vibrations also contain vibrations caused by the contact during the rotations of the rotational members (such as the gears and the bearings) in the rotational units (the hollow wrist 200 and the connection unit 250).

The vibration detection unit 130 is arranged between the air motor 102 and the rotational units (the hollow wrist 200 and the connection unit 250), and can thus detect the vibrations relating both therewith. Furthermore, the vibration detection unit 130 can detect the vibrations relating to the gear pump 310.

Figure 5:
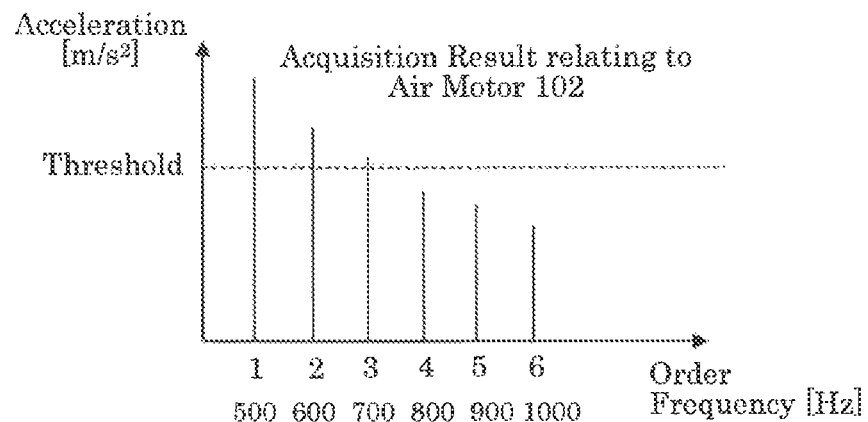
FIG. 5(a) to FIG. 5(c) are charts showing the acquisition result by the frequency component acquisition unit 22 according to the second embodiment of the present invention, show an acquisition result relating to the air motor 102 (FIG. 5(a)), show an acquisition result relating to the gear pump 310 (FIG. 5(b)), and show an acquisition result relating to the rotational units (the hollow wrist 200 and the connection unit 250) (FIG. 5(c))
Figure 5:
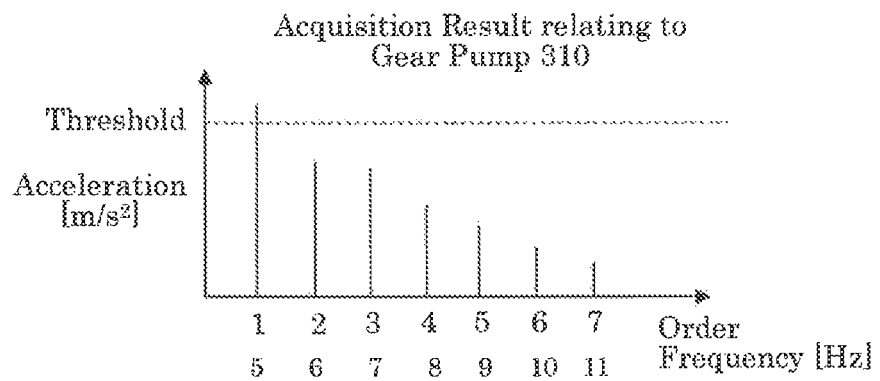
Figure 5:
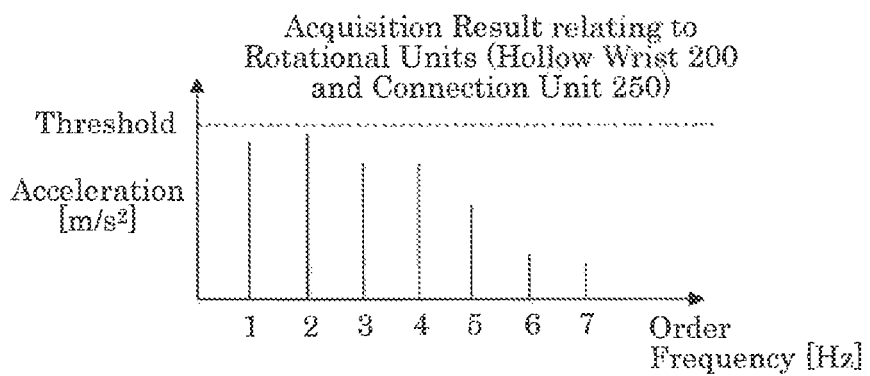

FIG. 5(a) to FIG. 5(c) are charts showing the acquisition result by the frequency component acquisition unit 22 according to the second embodiment of the present invention, show an acquisition result relating to the air motor 102 (FIG. 5(a)), show an acquisition result relating to the gear pump 310 (FIG. 5(b)), and show an acquisition result relating to the rotational units (the hollow wrist 200 and the connection unit 250) (FIG. 5(c)).

FIG. 5(a) is the same as FIG. 4(b), and a description thereof is therefore omitted.

The vibration caused by the (abnormal) contact during the rotations of the gears in the gear pump 310 occurs once while the gears in the gear pump 310 rotate once, for example. On this occasion, when the rotational speed of the gears in the gear pump 310 is 300 rpm, the (abnormal) contact between the gears occurs 5 times in 1 second. Thus, a vibration at 5 Hz occurs. It should be noted that this contact may occur 12, 14, 16, 18, 20, 22, . . . times while the gears rotate 10 times. Thus, vibrations at 6, 7, 8, 9, 10, 11, . . . Hz occur. It should be noted that the vibrations at 5, 6, 7, 8, 9, 10, 11 . . . Hz are respectively referred to as 1st, 2nd, 3rd, 4th, 5th, 6th, 7th . . . -order vibrations.

Referring to FIG. 5(b), the frequency component acquisition unit 22 applies the FFT analysis to the detection result by the vibration detection unit 130 to acquire components of the vibrations at 5, 6, 7, 8, 9, 10, 11, . . . Hz (1st, 2nd, 3rd, 4th, 5th, 6th, 7th, . . . -order vibrations). The abnormality determination unit 24 defines a threshold for the 1st, 2nd, 3rd, 4th, 5th, 6th, 7th . . . -order vibrations, and determines that the abnormality (such as abnormal contact between the gears) of the gear pump 310 occurs if the vibration component of each of the orders exceeds the threshold.

The 1st-order vibration exceeds the threshold in the case shown in FIG. 5(b), and it is thus determined that the abnormality occurs to the gear pump 310. It should be noted that if the abnormality of the gear pump 310 is not present, the accelerations corresponding to the 1st, 2nd, 3rd, 4th, 5th, 6th, and 7th, . . . -order vibrations do not exceed the threshold.

The vibration caused by the (abnormal) contact during the rotations of the rotational members (such as the gears and the bearing) in the rotational units (the follow wrist 200 and the connection unit 250) occurs once while the gears and the bearings in the rotational units rotate once (1st-order vibration), for example. It should be noted that this contact may occur 12, 14, 16, 18, 20, 22, . . . times while the rotational members rotate 10 times (2nd, 3rd, 4th, 5th, 6th, 7th, . . . -order vibrations). It should be noted that the rotational members rotate only up to a predetermined number of times (such as 3.5 times), the number of times of the contact increases/decreases in proportion to the predetermined number of times.

Referring to FIG. 5(c), the frequency component acquisition unit 22 applies the FFT analysis to the detection result by the vibration detection unit 130 to acquire components of the 1st, 2nd, 3rd, 4th, 5th, 6th, 7th, . . . -order vibrations. The abnormality determination unit 24 defines a threshold for the 1st, 2nd, 3rd, 4th, 5th, 6th, 7th . . . -order vibrations, and determines that the abnormality of the rotational units occurs if the vibration component of each of the orders exceeds the threshold.

Any of the vibrations do not exceed the threshold in the case shown in FIG. 5(c), and it is determined that the abnormality of the rotational units is not present.

It should be noted that the vibration detection unit 130 detects the vibrations of the paint device 1 as the change in the acceleration [m/s$^2$] with respect to the time [s], and any of vertical axes of FIG. 5(a), FIG. 5(b), and FIG. 5(c) thus represent the acceleration [m/s$^2$]. However, if the vibration detection unit 130 is a microphone, the microphone detects the vibrations of the paint device 1 as a change in the sound pressure [dB] with respect to the time [s], and any of the vertical axes of FIG. 5(a), FIG. 5(b), and FIG. 5(c) thus represent the sound pressure [dB]]. Moreover, if the vibration detection unit 130 is a displacement sensor, the displacement sensor detects the vibrations of the paint device 1 as a change in the displacement [m] of a portion at which the vibration detection unit 130 is arranged with respect to the time [s], and any of the vertical axes of FIG. 5(a), FIG. 5(b), and FIG. 5(c) thus represent the displacement [m].

A description will now be given of an operation of the second embodiment.

An operation of the paint device 1 according to the second embodiment is the same as that of the first embodiment, and a description thereof is therefore omitted.

The vibration detection unit 130 detects the vibrations of the paint device 1. The detection result is transmitted to the frequency component acquisition unit 22 of the state determination device 2 via the wireless communication.

The frequency component acquisition unit 22 acquires the frequency components caused by the contact between the rotational shaft 104 and the air motor 102, the frequency components caused by the contact during the rotations of the gears in the gear pump 310, and the frequency components caused by the contact during the rotations of the rotational members (such as the gears and the bearings) in the rotational units (the hollow wrist 200 and the connection unit 250).

On this occasion, if there are not causes such as the eccentricity of the rotary atomizer head 106 with respect to the rotational shaft 104, the air motor 102 normally rotates, and the accelerations corresponding to the 1st, 2nd, 3rd, 4th, 5th, 6th, . . . -order vibrations (refer to FIG. 5(a)) do not exceed the threshold. In this case, the abnormality determination unit 24 determines that the air motor 104 is normal.

However, if there are causes such as the eccentricity of the rotary atomizer head 106 with respect to the rotational shaft 104, the abnormality (such as the centrifugal whirling) of the air motor 104 occurs, and the accelerations corresponding to the 1st, 2nd, 3rd, 4th, 5th, 6th, . . . -order vibrations (refer to FIG. 4(b)) exceed the threshold. In this case, the abnormality determination unit 24 determines that the abnormality (such as the centrifugal whirling) of the air motor 104 occurs.

On this occasion, if there are not causes such as the (abnormal) contact during the rotations of the gears in the gear pump 310, the gears in the gear pump 310 normally rotate, and the accelerations corresponding to the 1st, 2nd, 3rd, 4th, 5th, 6th, 7th, . . . -order vibrations (refer to FIG. 5(b)) do not exceed the threshold. In this case, the abnormality determination unit 24 determines that the gear pump 310 is normal.

However, if there are causes such as the (abnormal) contact during the rotations of the gears in the gear pump 310, the abnormality of the gear pump 310 occurs, and the accelerations corresponding to the 1st, 2nd, 3rd, 4th, 5th, 6th, 7th, . . . -order vibrations (refer to FIG. 5(b)) exceed the threshold. In this case, the abnormality determination unit 24 determines that the abnormality of the gear pump 310 occurs.

On this occasion, if there are not causes such as the (abnormal) contact during the rotations of the rotational members (such as the gears and the bearings) in the rotational units (the hollow wrist 200 and the connection unit 250), the gears and the bearings in the rotational units normally rotate, and the accelerations corresponding to the 1st, 2nd, 3rd, 4th, 5th, 6th, 7th, . . . -order vibrations (refer to FIG. 5(c)) do not exceed the threshold. In this case, the abnormality determination unit 24 determines that the rotational units are normal.

However, if there are causes such as the (abnormal) contact during the rotations of the rotational members in the rotational units, the abnormality of the rotational members occurs, and the accelerations corresponding to the 1st, 2nd, 3rd, 4th, 5th, 6th, 7th, . . . -order vibrations (refer to FIG. 5(c)) exceed the threshold. In this case, the abnormality determination unit 24 determines that the abnormality of the rotational units occurs.

According to the second embodiment, the abnormality of the air motor 102, the gear pump 310, and the rotational units (the hollow wrist 200 and the connection unit 250), which are the rotating portions in the paint device 1, can be detected.

It should be noted that the frequency component acquisition unit 22 acquires both the frequency components caused by the contact during the rotations of the gears in the gear pump 310 and the frequency components caused by the contact during the rotations of the rotational members (such as the gears and the bearings) in the rotational units (the hollow wrist 200 and the connection unit 250) in the second embodiment. However, only either one thereof may be acquired.

In other words, the frequency component acquisition unit 22 may acquire the frequency components caused by the contact during the rotations of the gears in the gear pump 310 or the frequency components caused by the contact during the rotations of the rotational members (such as the gears and the bearings) in the rotational units (the hollow wrist 200 and the connection unit 250).

In this case, the abnormality determination unit 24 further determines whether the abnormality in the gear pump 310 or the rotational units exists based on the acquisition result by the frequency component acquisition unit 22.

Third Embodiment

A third embodiment is different from the first embodiment in such a point that whether the abnormality of the paint device 1 exists or not is determined based on an angular acceleration of the paint device 1.

The configuration of the paint device 1 according to the third embodiment is the same as that of the first embodiment except for such a point that an angular acceleration detection unit 132 is provided. The angular acceleration detection unit 132 detects an angular acceleration of the paint device 1 as an X component, a Y component, and a Z component individually. It should be noted that X, Y, and Z directions are directions orthogonal to one another. The angular acceleration detection unit 132 is a gyro sensor arranged on a surface of the paint device 1 (such as a surface of the robot arm 300). It should be noted that the angular acceleration detection unit 132 may be integral with the vibration detection unit 130.

Figure 6:
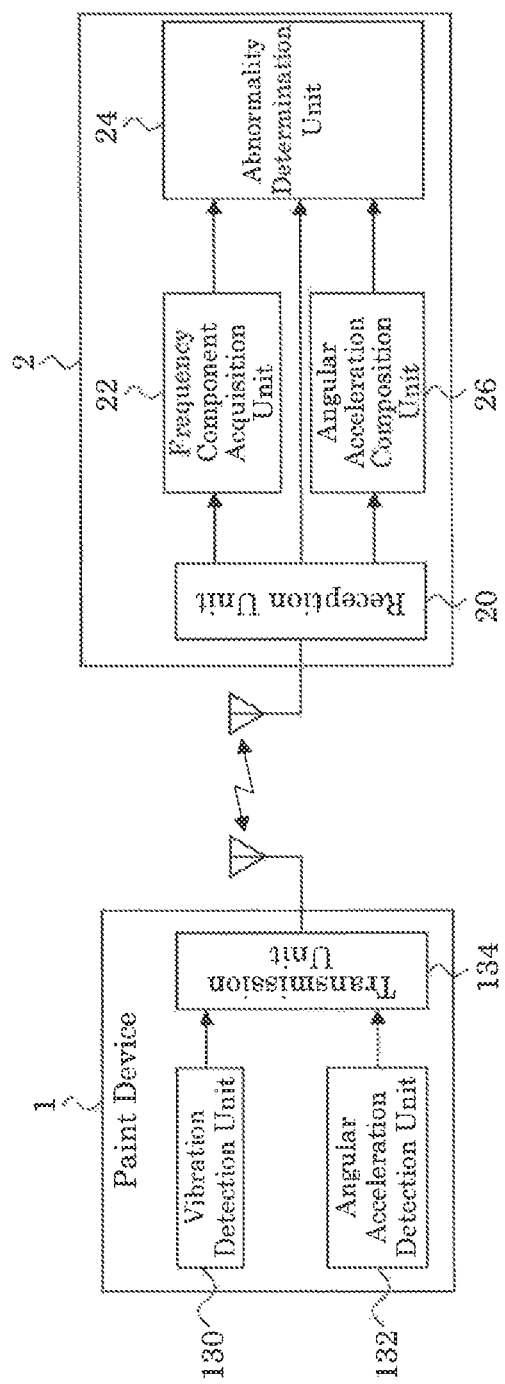
FIG. 6 is a functional block diagram showing the configurations of the paint device 1 and the state determination device 2 according to the third embodiment of the present invention.

FIG. 6 is a functional block diagram showing the configurations of the paint device 1 and the state determination device 2 according to the third embodiment of the present invention. It should be noted that the paint device 1 is schematically illustrated as a block, and only the vibration detection unit 130, the angular acceleration detection unit 132, and a transmission unit 134 out of components are illustrated as blocks in FIG. 6. The state determination device 2 is configured to determine a state of the paint device 1, and includes the reception unit 20, the frequency component acquisition unit 22, the abnormality determination unit 24, and an angular acceleration composition unit 26.

The paint device 1 according to the third embodiment includes the vibration detection unit 130, the angular acceleration detection unit 132, and the transmission unit 134. The vibration detection unit 130 is the same as that of the first embodiment, and a description thereof is therefore omitted. The transmission unit 134 acquires detection results from the vibration detection unit 130 and the angular acceleration detection unit 132, and transmits the detection results to the state determination device 2.

The reception unit 20 of the state determination device 2 receives the detection results from the transmission unit 134 of the paint device 1, provides the detection result by the vibration detection unit 130 to the frequency component acquisition unit 22, and provides the detection result by the angular acceleration detection unit 132 to the abnormality determination unit 24 and the angular acceleration composition unit 26.

The frequency component acquisition unit 22 is the same as that of the first embodiment, and a description thereof is therefore omitted.

The angular acceleration composition unit 26 composes the detection results (the X component, the Y component, and the Z component of the angular acceleration of the paint device 1) by the angular acceleration detection unit 132 to acquire the angular acceleration of the paint device 1, and provides the abnormality determination unit 24 with the angular acceleration.

The abnormality determination unit 24 determines the abnormality based on the detection result by the vibration detection unit 130 (as in the first embodiment and the second embodiment).

The abnormality determination unit 24 further determines whether an abnormality of the paint device 1 exists or not based on the detection results (the X component, the Y component, and the Z component of the angular acceleration of the paint device 1 received from the reception unit 20 and the angular acceleration of the paint device 1 received from the angular acceleration composition unit 26) by the angular acceleration detection unit 132.

In other words, permissible upper limit and lower limit (respectively referred to as upper limit threshold and lower limit threshold) for each of the angular acceleration of the paint device 1 and the X component, the Y component, and the Z component of the angular acceleration of the paint device 1 are defined. Further, the abnormality determination unit 24 determines that the abnormality exists if each of the X component, the Y component, and the Z component of the angular acceleration of the paint device 1 received from the reception unit 20 is more than the upper limit threshold or less than the lower limit threshold. Furthermore, the abnormality determination unit 24 determines that the abnormality exists if the angular acceleration of the paint device 1 received from the angular acceleration composition unit 26 is more than the upper limit threshold or less than the lower limit threshold.

According the third embodiment, the abnormality determination can be carried out in accordance with the angular acceleration of the paint device 1. For example, when the paint device 1 presents a quick acceleration or a quick deceleration, the angular acceleration quickly increases or quickly decreases, and it is possible to determine whether the abnormality exists or not on this occasion.

It should be noted that the high voltage HV is impressed on the paint tool 100 from the outside in the above-described embodiments. However, a low voltage LV may be impressed from the outside, and the low voltage LV may be boosted to a high voltage inside the paint tool 100. A description will now be given of such a variation.

Figure 7:
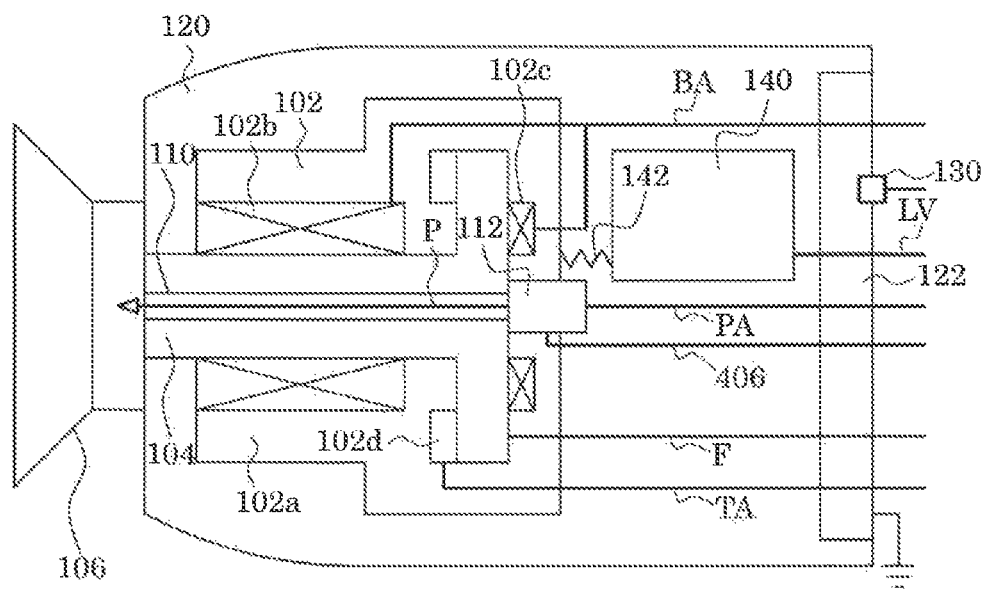
FIG. 7 is a front transparent view showing the variation of the paint tool 100.

FIG. 7 is a front transparent view showing the variation of the paint tool 100. A description will now be given of only a difference from the paint tool 100 in FIG. 2. The paint tool 100 in FIG. 7 includes a high voltage generator 140 and a wire 142. The high voltage generator 140 is arranged inside the housing 120, and is arranged between the air motor 102 and the rear plate 122. The low voltage LV is impressed on the high voltage generator 140 from the outside of the paint tool 100, and the high voltage generator 140 boosts the low voltage LV to the high voltage. The wire 142 connects the high voltage generator 140 and the air motor 102 with each other. The high voltage generated by the high voltage generator 140 is impressed on the air motor 102.

Moreover, the embodiments can be realized in the following way. A computer provided with a CPU, a hard disk, and a media (such as a floppy disk (registered trade mark)

and a CD-ROM) reader is caused to read a medium recording a program realizing the respective components (such as the frequency component acquisition unit 22 and the abnormality determination unit 24) of the state determination device 2, thereby installing the program on the hard disk. The above-described functions can also be realized in this way.

100 Paint Tool
102 Air Motor
102*a* Air Motor Housing
102*b* Radial Air Bearing
102*c* Thrust Air Bearing
102*d* Turbine
104 Rotational Shaft
106 Rotary Atomizer Head
110 Feed Tube
112 Trigger Valve
120 Housing
120*a*, 120*b* External Electrode
122 Rear Plate
130 Vibration Detection Unit
132 Angular Acceleration Detection Unit
1 Paint Device
200 Hollow Wrist
250 Connection Unit
310 Gear Pump
402, 404, 406 Tube
2 State Determination Device
22 Frequency Component Acquisition Unit
24 Abnormality Determination Unit

The invention claimed is:

1. A state determination device for determining a state of a paint device comprising an air motor that rotates by a supply of a gas, the air motor includes a rotational shaft that is configured as a rotational center of the air motor, and a rotary atomizer head that is connected to the rotational shaft and sprays paint, the paint device further comprising a vibration detection unit that detects a vibration of the paint device, the state determination device comprising:
a central processing unit (CPU) that
acquires a frequency component caused by a contact between the rotational shaft and another part of the air motor from a detection result by the vibration detection unit; and
determines whether an abnormality of the air motor exists or not based on an acquisition result of the acquired frequency component.

2. The state determination device according to claim 1, wherein the vibration detection unit is any one of an acceleration sensor, a microphone, and a displacement sensor.

3. The state determination device according to claim 2, wherein the CPU acquires the detection result from the vibration detection unit via wireless communication.

4. The state determination device according to claim 1, wherein the vibration detection unit is arranged on a side opposite to the rotary atomizer head with respect to the air motor.

5. The state determination device according to claim 4, wherein the CPU acquires the detection result from the vibration detection unit via wireless communication.

6. The state determination device according to claim 1, wherein:
the paint device further comprises a gear pump that feeds the paint toward the rotary atomizer head, and a rotational unit for changing an attitude of the rotary atomizer head;
the CPU further acquires a frequency component caused by a contact during a rotation of a gear in the gear pump and/or a contact during a rotation of a rotational member in the rotational unit; and
the CPU further determines whether an abnormality of the gear pump and/or the rotational unit exists or not based on the acquisition result.

7. The state determination device according to claim 6, wherein the CPU acquires the detection result from the vibration detection unit via wireless communication.

8. The state determination device according to claim 6, wherein the vibration detection unit is arranged between the air motor and the rotational unit.

9. The state determination device according to claim 8, wherein the CPU acquires the detection result from the vibration detection unit via wireless communication.

10. The state determination device according to claim 8, wherein the rotational unit is arranged between the air motor and the gear pump.

11. The state determination device according to claim 10, wherein the CPU acquires the detection result from the vibration detection unit via wireless communication.

12. The state determination device according to claim 1, wherein:
the paint device further comprises an angular acceleration detection unit that detects an angular acceleration of the paint device; and
the CPU further determines whether an abnormality of the paint device exists or not based on a detection result by the angular acceleration detection unit.

13. The state determination device according to claim 12, wherein the CPU acquires the detection result from the vibration detection unit via wireless communication.

14. The state determination device according to claim 1, wherein the CPU acquires the detection result from the vibration detection unit via wireless communication.

15. A state determination method of determining a state of a paint device comprising
an air motor that rotates by a supply of a gas, the air motor includes a rotational shaft that is configured as a rotational center of the air motor,
a rotary atomizer head that is connected to the rotational shaft and sprays paint, and
a vibration detection unit that detects a vibration of the paint device,
the state determination method comprising:
acquiring, by a central processing unit (CPU), a frequency component caused by a contact between the rotational shaft and another part of the air motor from a detection result by the vibration detection unit; and
determining, by the CPU, whether an abnormality of the air motor exists or not based on an acquisition result by the acquiring of the frequency component.

16. A method comprising:
rotating an air motor included in a paint device by a supply of gas, wherein the air motor includes a rotational shaft that is configured as a rotational center of the air motor, and the paint device further includes a rotary atomizer head that is connected to the rotational shaft and sprays paint,
detecting, by a vibration detection unit, a vibration of the paint device:
acquiring, by a central processing unit (CPU), a frequency component caused by a contact between the rotational shaft and another part of the air motor from a detection result by the vibration detection unit; and determining, by the CPU, whether an abnormality of the air motor exists or not based on an acquisition result by the acquiring of the frequency component.

17. A non-transitory computer-readable medium having a program of instructions for execution by a computer to perform a state determination process of determining a state of a paint device comprising
- an air motor that rotates by a supply of a gas, the air motor includes a rotational shaft that is configured as a rotational center of the air motor,
- a rotary atomizer head that is connected to the rotational shaft and sprays paint, and
- a vibration detection unit that detects a vibration of the paint device,
- the state determination process comprising:
- acquiring, by a central processing unit (CPU), a frequency component caused by a contact between the rotational shaft and another part of the air motor from a detection result by the vibration detection unit; and
- determining, by the CPU, whether an abnormality of the air motor exists or not based on an acquisition result by the acquiring of the frequency component.

* * * * *